United States Patent [19]
Iwamura et al.

[11] Patent Number: 5,590,361
[45] Date of Patent: Dec. 31, 1996

[54] MICROPROCESSOR HAVING AN EFFECTIVE BICMOS EXTRA MULTIPLE INPUT COMPLEX LOGIC CIRCUIT

[75] Inventors: Masahiro Iwamura; Tatsumi Yamauchi; Shigeya Tanaka, all of Hitachi; Kazutaka Mori, Higashiyamato, all of Japan

[73] Assignee: Hitachi, Ltd., Tokyo, Japan

[21] Appl. No.: 364,406

[22] Filed: Dec. 23, 1994

Related U.S. Application Data

[63] Continuation of Ser. No. 748,511, Aug. 22, 1991, abandoned.

[30] Foreign Application Priority Data

Aug. 31, 1990 [JP] Japan .................... 2-228136

[51] Int. Cl.⁶ .................................. G06F 15/00
[52] U.S. Cl. .................. 395/800; 326/110; 326/126; 364/947.1; 364/DIG. 2
[58] Field of Search ................... 395/800, 425; 326/110, 58, 126; 364/947.1, DIG. 2

[56] References Cited

U.S. PATENT DOCUMENTS

| | | | |
|---|---|---|---|
| 3,649,844 | 3/1972 | Kroos | 307/216 |
| 4,734,876 | 3/1988 | Williams | 364/715.06 |
| 4,779,014 | 10/1988 | Masuoka et al. | 307/446 |
| 4,948,991 | 8/1990 | Schucker et al. | 307/455 |
| 5,045,723 | 9/1991 | Mao | 248/65 |
| 5,047,669 | 9/1991 | Iwamura et al. | 307/446 |
| 5,059,821 | 10/1991 | Murabayashi et al. | 307/360 |
| 5,068,548 | 11/1991 | El Gamel | 326/58 |
| 5,077,489 | 12/1991 | Gola et al. | 307/362 |
| 5,166,552 | 11/1992 | Aipperspach et al. | 326/110 |
| 5,191,240 | 3/1993 | Fleischer | 307/446 |
| 5,333,296 | 7/1994 | Bouchard et al. | 395/425 |

*Primary Examiner*—Alyssa H. Bowler
*Assistant Examiner*—John Harrity
*Attorney, Agent, or Firm*—Antonelli, Terry, Stout & Kraus

[57] ABSTRACT

An extra large number-of-input complex logic circuit, employed inside a microprocessor for performing a large number of controls and arithmetic operations, is constructed utilizing $N(N \geq 2)$ number of a unit logic circuit each comprising $M(M \geq 1)$ input CMOS logic circuits and one bipolar transistor, whereby respective outputs are integrated to produce one output in response to M×N number input signals to provide a high speed, high density integration and low power consumption microprocessor.

21 Claims, 11 Drawing Sheets

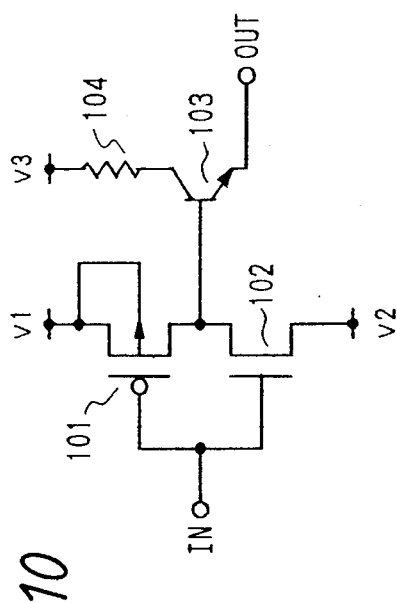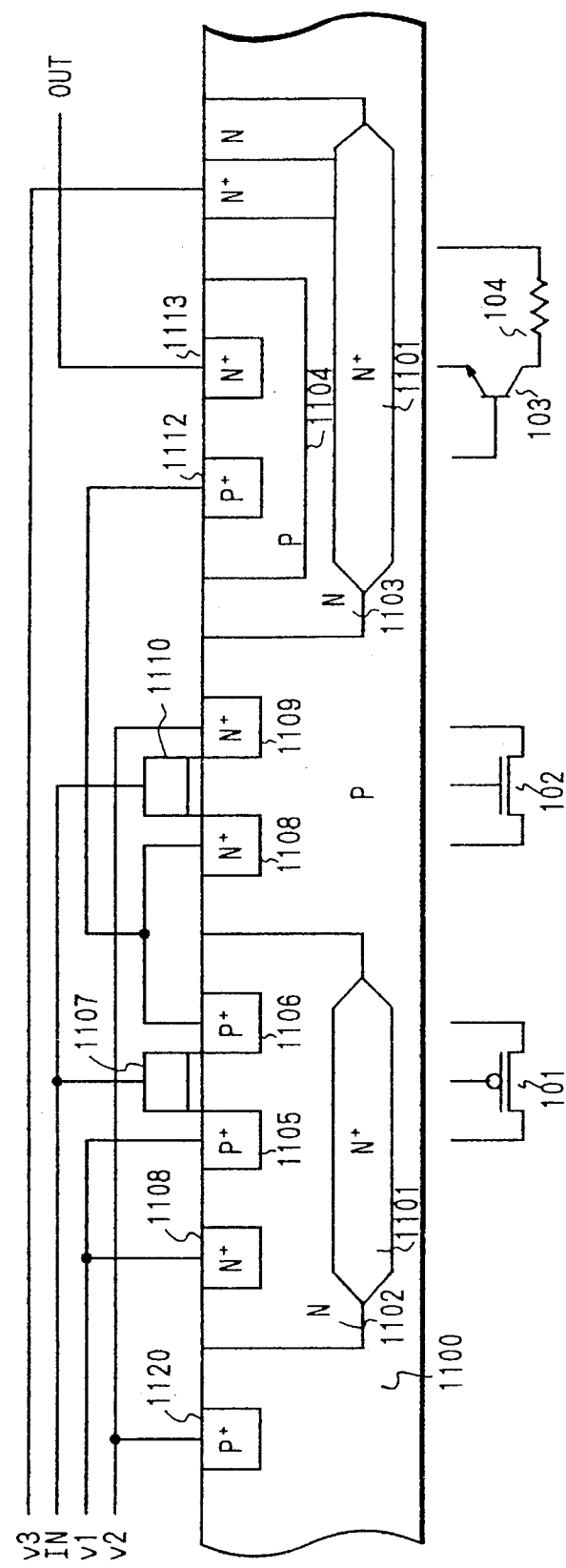
FIG. 10
FIG. 11

MICROPROCESSOR HAVING AN EFFECTIVE BICMOS EXTRA MULTIPLE INPUT COMPLEX LOGIC CIRCUIT

This application is a continuation of Ser. No. 07/748,511, filed Aug. 22, 1991, now abandoned.

BACKGROUND OF THE INVENTION

The present invention pertains to a microprocessor and a complex logic circuit utilizing the BiCMOS technology.

Heretofore, the BiCMOS technology has been applied widely to high speed SRAMs and gate arrays, and has proved to have excellent properties of high speed operation and low power consumption. With the recent remarkable advancements in the performance of RISC and CISC processors, it is predicted that, by the middle of 1990s, more advanced microprocessors capable of operating at 100 or more MIPS will be available. Because it will be crucial for microprocessors of the future to be provided with a built-in large capacity cache memory and, likewise, an FPU which require several million order integration of transistors on a chip, it is most preferable to employ BiCMOS technology which is capable of satisfying the fast operation, higher density integration and lower power consumption.

Such a prior art microprocessor utilizing the BiCMOS technology has been described in the IEEE, J. of SOLID STATE CIRCUITS Vo. 23, No. 2 April 1988, pp 500–506.

In a microprocessor, super multi inputs static logic circuits are frequently used. However, they are composed of CMOS gates or latch circuits having, at most, three to four inputs, therefore, there arise such problems as follows in the implementation of an extra high speed, high density integration microprocessor operating in excess of 100 MHz.
1) In proportion to an increase in the number of inputs, the number of logical stages increases, thereby increasing path delay, which proves to be a large hindrance to high speed operation.
2) The increased number of logic gates results in an increased area of device regions.
3) An increased number of interconnecting wiring required for connecting between the above logic gates increases a chip size.
4) An increased number of logic circuits increases power consumption.

SUMMARY OF THE INVENTION

An object of the present invention is to provide a microprocessor featuring extra high speed, high density integration, and low power consumption free from the aforementioned prior art problems. Another object of the present invention is to provide an effective BiCMOS extra multiple input complex logic circuit applicable, in addition to the above microprocessor, to other logic LSIs, and memory LSIs.

In order to accomplish the above objects according to the present invention, an extra large number-of-input complex logic circuit utilized inside a microprocessor for performing a large number of controls and arithmetic operations, is constructed by utilizing $N(N \geq 2)$ number of a unit logic circuit comprising $M(M \geq 1)$ input CMOS logic circuits and one bipolar transistor, whereby respective outputs thereof are integrated to produce one output in response to M×N number input signals.

According to the present invention, it is possible to obtain one output signal in response to an extra large number of input signals, by processing the extra large number of input logic signals in parallel through a plurality of unit logic circuits which handle a comparatively small number of inputs; and integrating respective outputs to yield one output.

Thereby, the logic stages have been drastically reduced by comparison with the prior art. The reduction in the logic stages contributes to a substantial decrease in the circuit delays, and also drastically decreases the number of logic circuits to be employed and interconnecting wirings for connection therebetween.

BRIEF DESCRIPTION OF THE DRAWINGS

These and other objects, features and advantages of the present invention will be understood more clearly from the following detailed description with reference to the accompanying drawings, wherein

FIG. 10 is a circuitry diagram explaining the device structure of the invention.

FIG. 11 shows a cross-sectional view of the device according to the invention.

DESCRIPTION OF THE PREFERRED EMBODIMENTS

Figure 1:
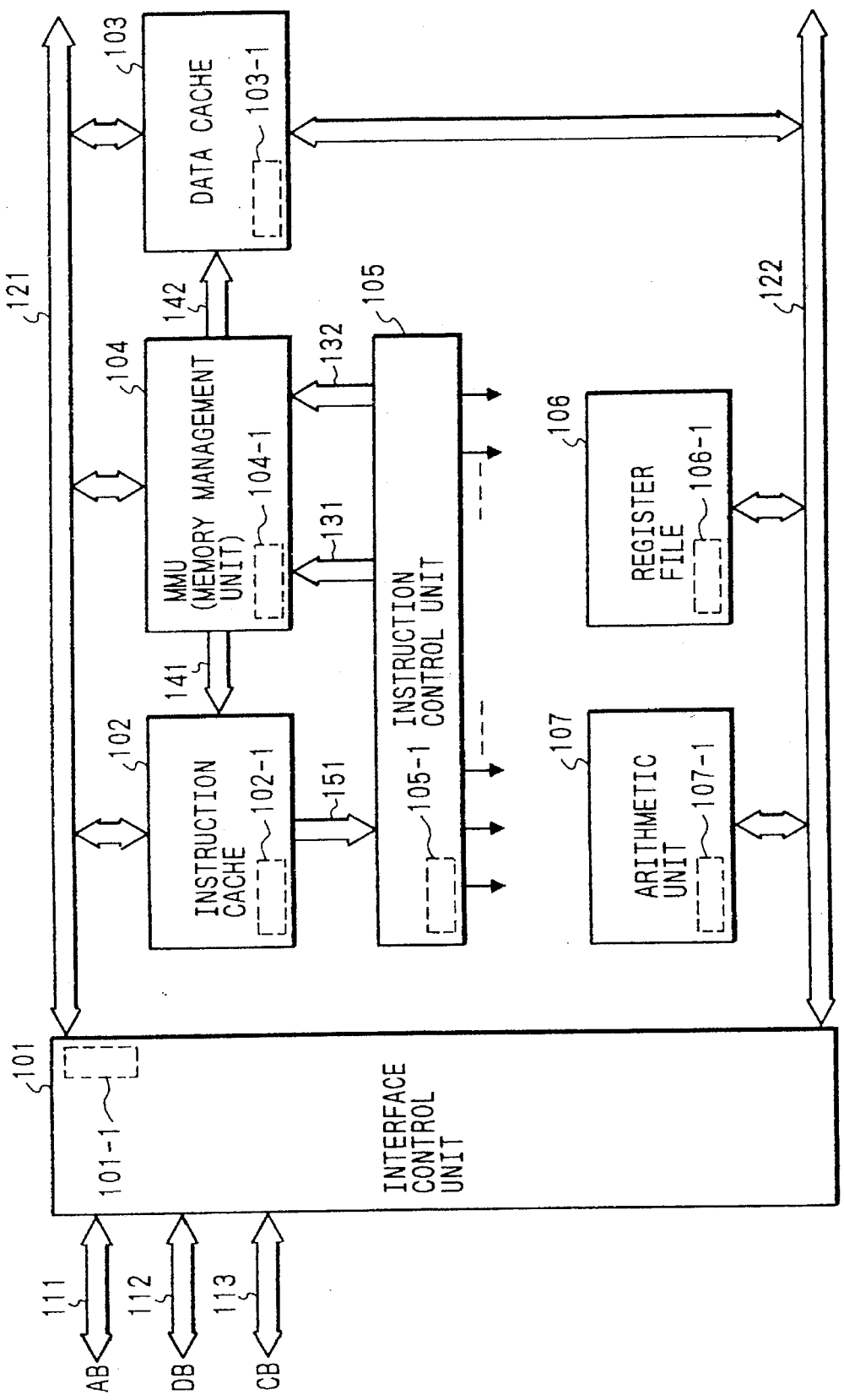
FIG. 1 shows a microprocessor of an embodiment of the present invention.

FIG. 1 shows a schematic block diagram of a microprocessor according to the present invention.

In the figure, reference 101 shows an interface control which controls data flow between the inside of the microprocessor and external peripheral equipment (for instance main memory).

Interfacing with the external equipment is done through an address bus 111, a data bus 112, and a control bus 113, while interfacing with inside the microprocessor is done through buses 121 and 122.

Numeral 102 denotes an instruction cache where a copy of part of the external main memory is stored as instruction data. Numeral 103 denotes a data cache where a copy of part of the external main memory is stored as operational data.

Numeral 104 denotes an MMU (Memory Management Unit) which controls read-out and write-in from and to the cache memory 102 and 103, hit check and the like.

Numeral 105 denotes an instruction control which fetches instructions from the instruction cache 102, decodes, and outputs various operational control signals.

It also outputs instruction fetch address 131 and operand fetch address 132 to the MMU 104.

Numeral 107 denotes an arithmetic operational unit where arithmetic operations, logical operations, shift operations and the like are performed.

Numeral 106 denotes a register file where temporary data in midstream of a series of operations are stored.

Here, the interface control 101 contains a bus snoop circuit 101-1. This circuit watches the address bus 111 and the control bus 113 all the time, and when any other bus master executes write-in to the main memory, and if the same address data is cached inside, outputs a signal for invalidating the write-in. For this purpose, it is necessary to have an extra multibit coincidence logic circuit for detecting coincidence between the data from the address bus 111 and the stored caching address.

For example, when building a 32 bit comparator using the prior art CMOS gate circuits, 5 to 6 stages of logic circuits including the input to the output stages will be required, needing approximately 50 logic gates. Further in the future when the bus width is likely to be enhanced to 64 bits, additional 1 to 2 stages of logic circuits will be required, totalling approximately 100 gates of logic circuits.

Such multistage logic circuits involves a large path delay throughout, from the input to the output, and thereby will not be able to cope with the requirements for a faster bus, for instance, exceeding 100 MHz in the future.

The bus snoop circuit 101-1 according to the present invention implements a logic circuit capable of performing the above multibit data comparison with substantially only one logic stage as will be described later. Thereby, it is capable of coping fully with a high speed bus transfer rate, for example, exceeding 100 MHz in the future. In addition it can be realized with a reduced number of logic circuits.

Further, in the instruction cache 102 and the data cache 103, there are included extra multiple input complex logic circuits 102-1 and 103-1, respectively. In practice, these circuits comprise an extra multibit comparator and, likewise, the parity checker. A plurality of multibit comparators are used for comparing the logic address and TAG address within the cache, or for checking an access right and the like. This comparator utilizes the same multibit comparator implemented by using substantially one stage of logic circuit as described above.

The parity checker is necessary for improving the reliability of data read out of the memory. For example, for a cache memory with an 8 byte parallel read-out, parity check for as many as 72 bit data including byte unit parity bits is required.

The same circuits composed in combination with the prior art CMOS gate circuits will require 6 to 7 stages of logic circuits including input to output, thereby requiring approximately 70 logic gates.

Further, the number of wiring for interconnecting these logic circuits will increase accordingly.

Because it is required for the parity check to output its results at the same cycle time as the cache memory read-out or even faster than that, there arises a problem that the above multistage logic circuits will not be able to cope with the requirements for a future super high performance microprocessor operating at machine cycles of a few ns.

The parity check circuit according to the present invention accomplishes the above extra multibit data parity check in substantially a two stage logic circuit as will be described later. Therefore, the present circuit has the, capability to fully cope with the high speed operation of extra high performance microprocessors operating at machine cycles of a few ns or less, in addition, implementing very complex logic circuits with a reduced number of logic circuits.

Further, in this embodiment, a parity checker of the above type is utilized as 106-1 in the register file 106 for conducting parity check corresponding to the data read out of the register file.

In the instruction control 105, an extra multiple input complex logic circuit 105-1 including an extra multiple input OR circuit is provided for collecting, for instance, various status signals and error signals, then, according to their results, to control the flow of operations.

Also the arithmetic unit 107 is provided with an extra multiple input complex logic circuit 107-1 including an extra multiple input NAND circuit or NOR circuit for detecting whether the operational input data or operational resultant data is ALL "1" or ALL "0".

For example, if we attempt to detect ALL "1" for a 32 bit data using a prior art three input gate structure, four stages of logic circuits will be required including input through output, totalling 17 in the number of logic circuits.

Because of a prolonged path delay throughout the input to the output involved in such multistage logic circuits, there arises a problem that the repeat cycle of the operational system also must be prolonged accordingly. Further, even if a check-specific pipeline stage were provided, there arises a problem that it still could not cope with the requirements for an extra high performance microprocessor of a few ns machine cycle class.

The extra multibit NAND (or NOR) gates according to the present invention are capable of being composed of substantially one stage logic circuit as will be described later, thereby solving the above-mentioned problems. It has the capability to fully cope with a high speed of an extra high performance microprocessor operating at machine cycles of a few ns or less with a reduced number of logic circuits than the prior art circuits.

Figure 2:
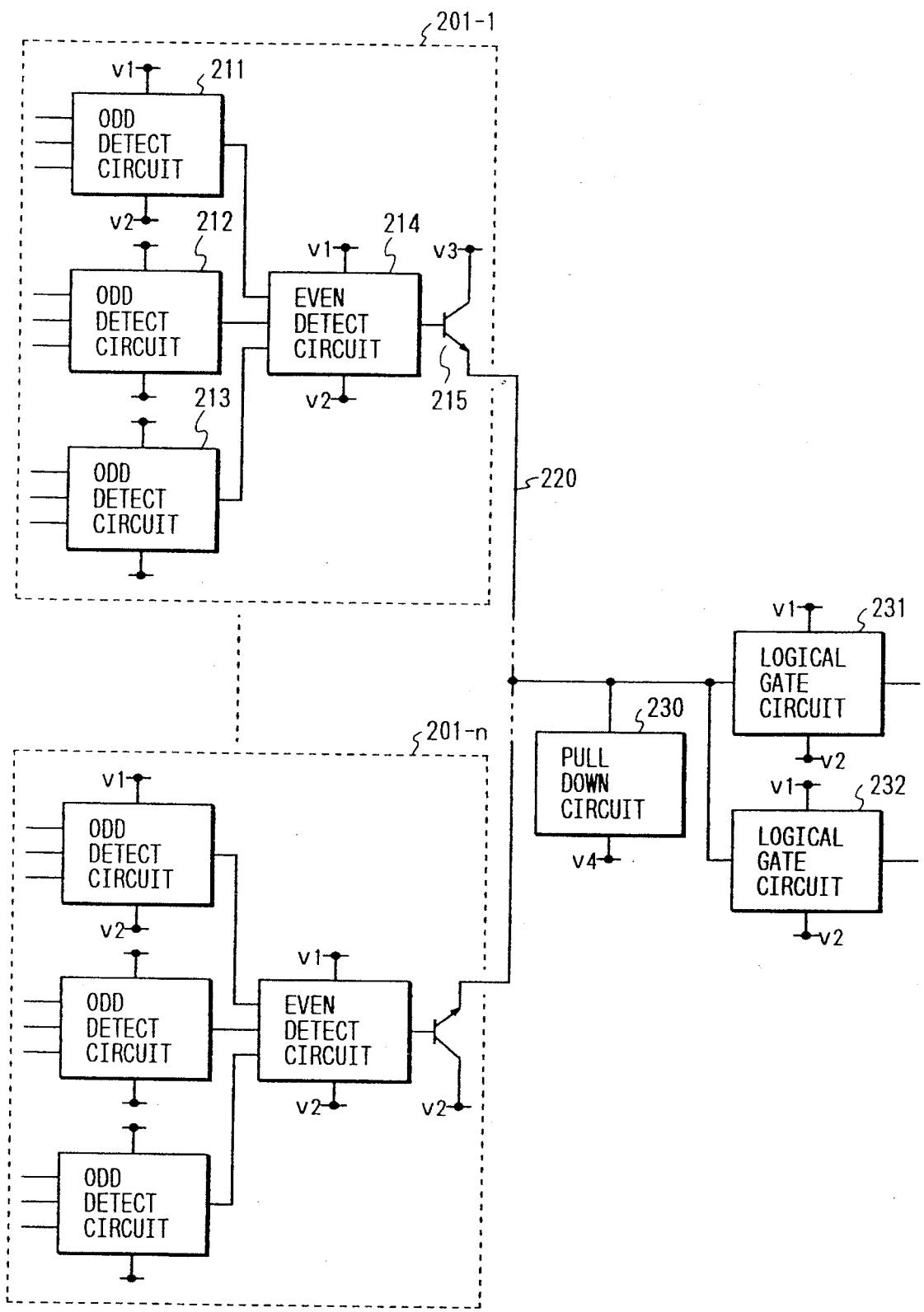
FIG. 2 shows an n byte parity checker of an embodiment of the invention.
Figure 3:
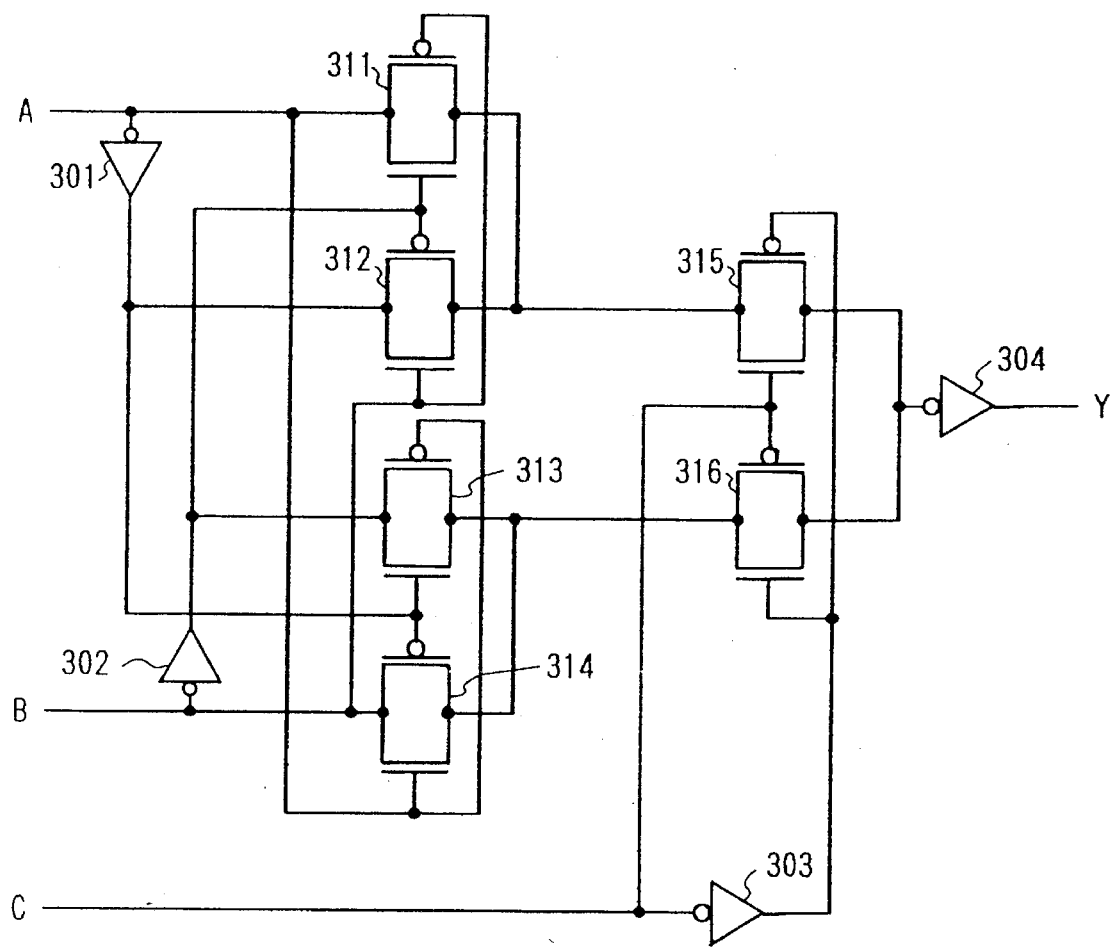
FIG. 3 shows a three input odd/even checker circuit of an embodiment of the invention.

FIG. 2 shows a block diagram of the parity check circuit of an embodiment of the present invention. In the figure, numerals 201-1 through 201-n denote byte parity detection circuits in which eight bit data and one bit parity bit are input, and a parity check result is output for each unit byte. In the byte parity check circuit 201-1, numerals 211 through 213 denote three input odd-number detection circuits composed of CMOS circuits as shown in FIG. 3, and numeral 214 denotes a three input even-number check circuit having a configuration similar to that of FIG. 3.

Further, numeral 215 is an NPN transistor (hereinafter referred to as NPN), of which the collector is connected to a power source V3, the base connected to the output of even-number detection circuit 214, and the emitter connected to a common output line 220. In this embodiment, when the number "1" for the 9 bit input data is an even number, the NPN transistor is activated to output "1" level as a parity error, and when the number is an odd number, the NPN transistor is not activated.

Respective outputs from n byte parity check circuits 201-1 through 201-n are connected to a common output line 220 and directed outward. Therefore, if there exists even one byte of parity error among n byte data, a "1" level is output to the common output line 220, and when there exists no parity error, the output line is not energized.

Figure 4:
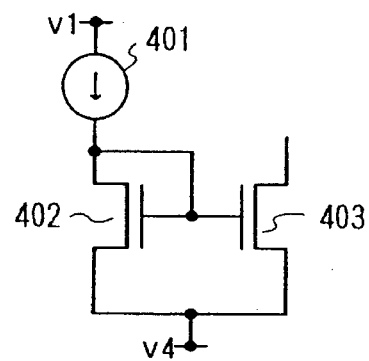
FIG. 4 shows a pull-down circuit of an embodiment of the invention.

Numeral 230 denotes a pull-down circuit composed of a MOS current mirror circuit as shown in FIG. 4, which pulls down the common output line 220 to "0" level when the common output line 220 is not energized.

Numerals 231 and 232 denote logic circuits to which the results of parity check are input and processed according to a predetermined procedure. They are comprised of CMOS logic circuits, BiCMOS logic circuits, ECL logic circuits and the like.

In FIG. 2, the relationship between power sources V1 and V3 always maintains that V1≦V3, and it never occurs that v1>V3. According to the preferred embodiments of the present invention, V1 and V3 should be preferably low voltages approximately from 3.3 V to 2.5 V, and V2=0 V. Further, when V1 and V3 are set at 0 V, V2 should be low voltages approximately from −3.3 V to −2.5 V.

As will be described later in detail, in order to indeed realize an extra high speed performance which is one of the objects of the present invention, it can hardly be allowed that each bipolar transistor and MOS transistor may be of any type.

For example, with respect to the NPN, it falls into a fatal saturation state at turn-on if its collector resistance is not small enough. Further, a PMOS transistor (hereinafter referred to as PMOS) which supplies a base current to the NPN should not be such that its channel conductance tends to be modulated affected by a turn-on action of the NPN.

Figure 5:
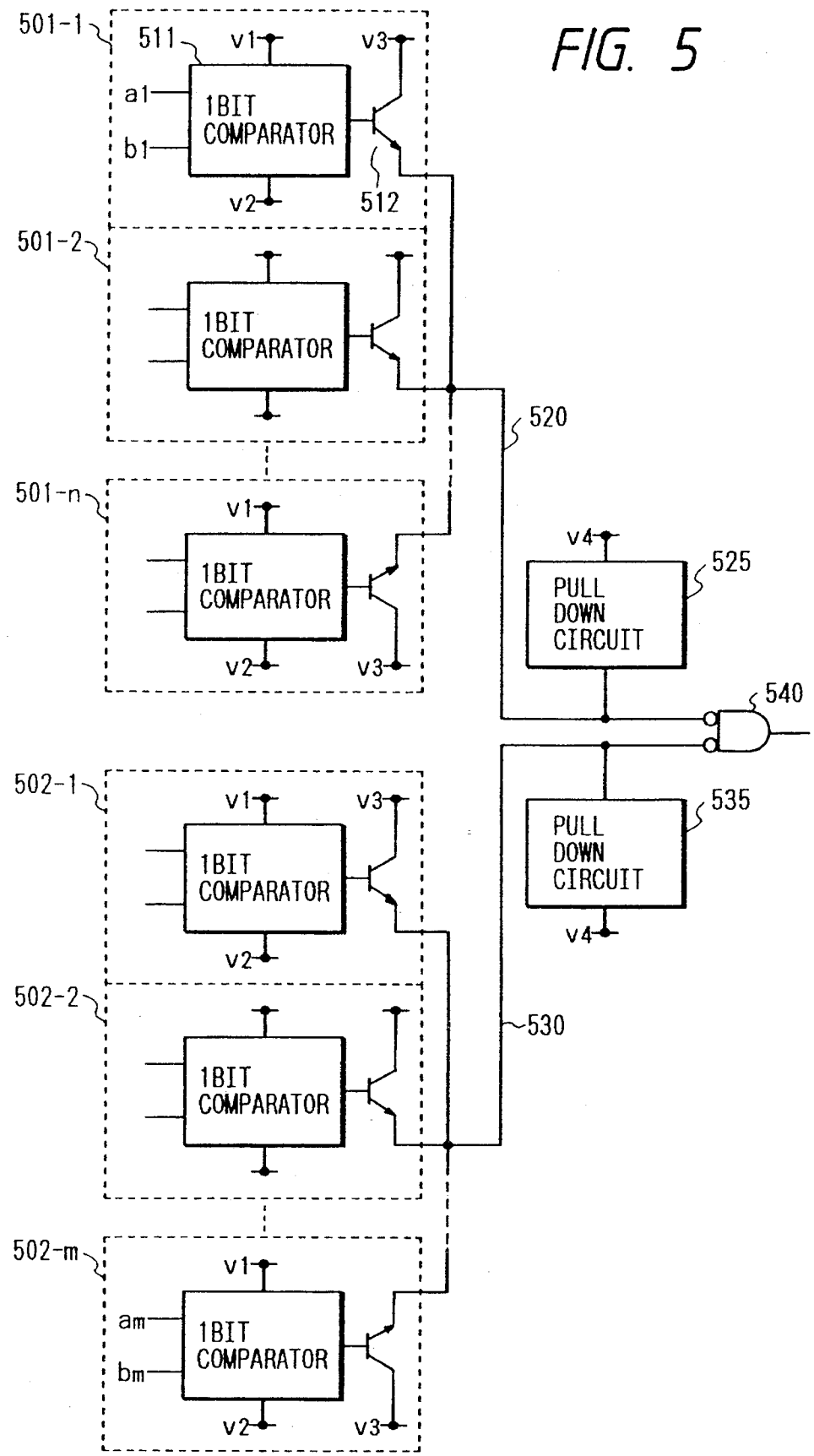
FIG. 5 shows an (m+n) bit comparator of an embodiment of the invention.
Figure 6:
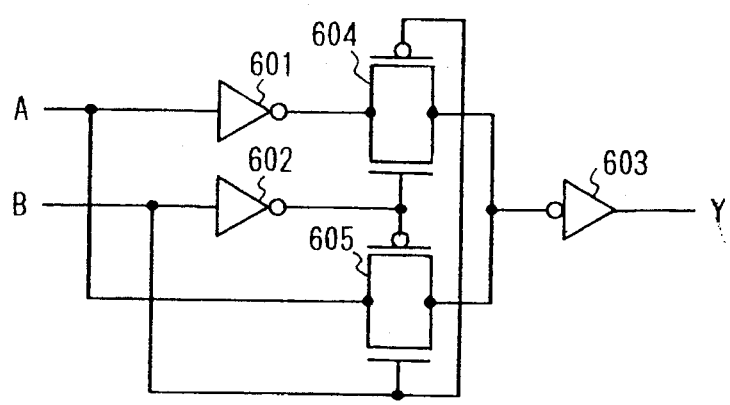
FIG. 6 shows an EOR circuit of an embodiment of the invention.
Figure 15:
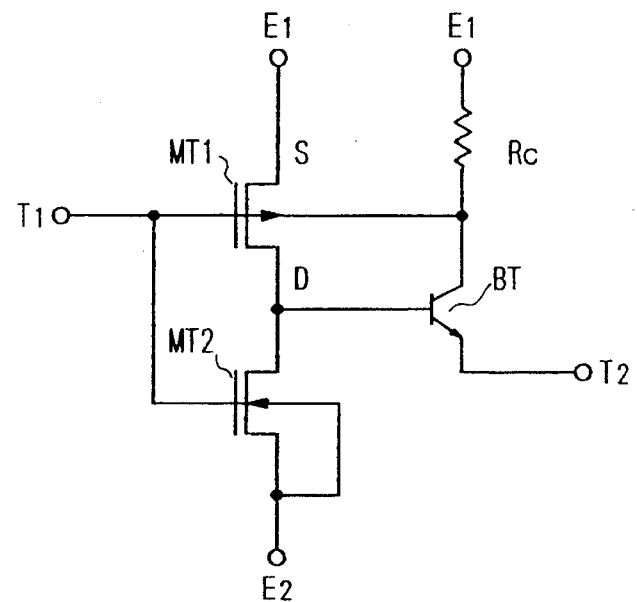
FIG. 15 is a circuit diagram explaining a prior art device structure.
Figure 16:
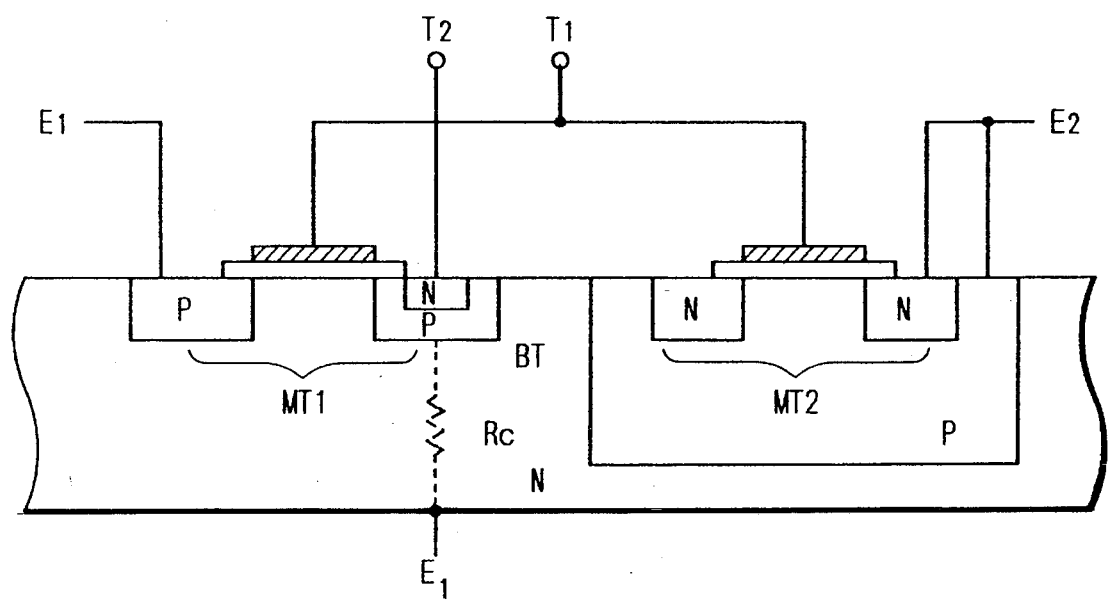
FIG. 16 is a diagram showing a prior art device structure cross-section.

Thereby, it is impossible to make use of the advantages and effects of the present invention through the use of an NPN transistor formed with the substrate of a MOS device as its collector as shown in FIGS. 15 and 16 corresponding to FIGS. 6 and 5 in the Japanese Patent Publication No. 52-26181 (1977), or through the use of the PMOS transistor formed with the collector region of the NPN transistor as its substrate likewise.

Figure 14:
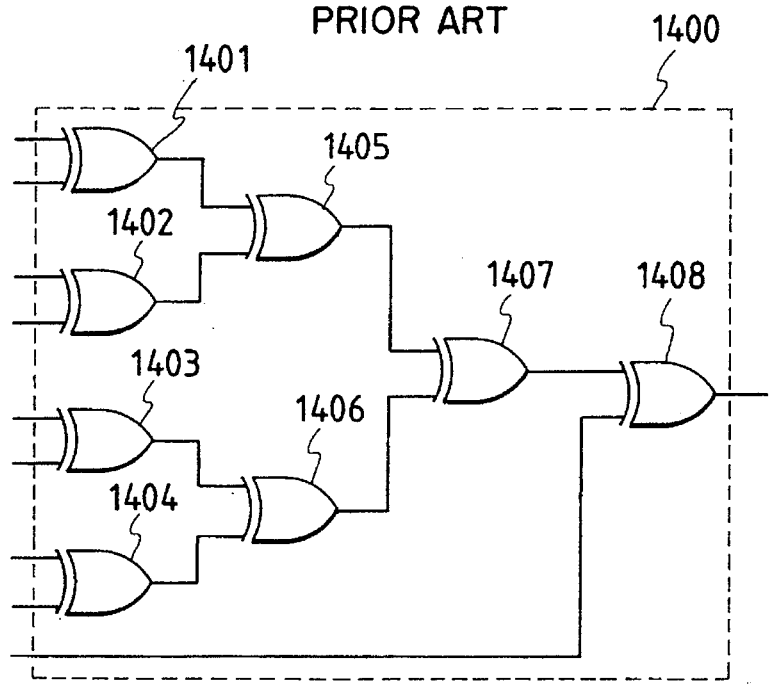
FIG. 14 shows a prior art 1 byte parity detection circuit diagram.
Figure 13:
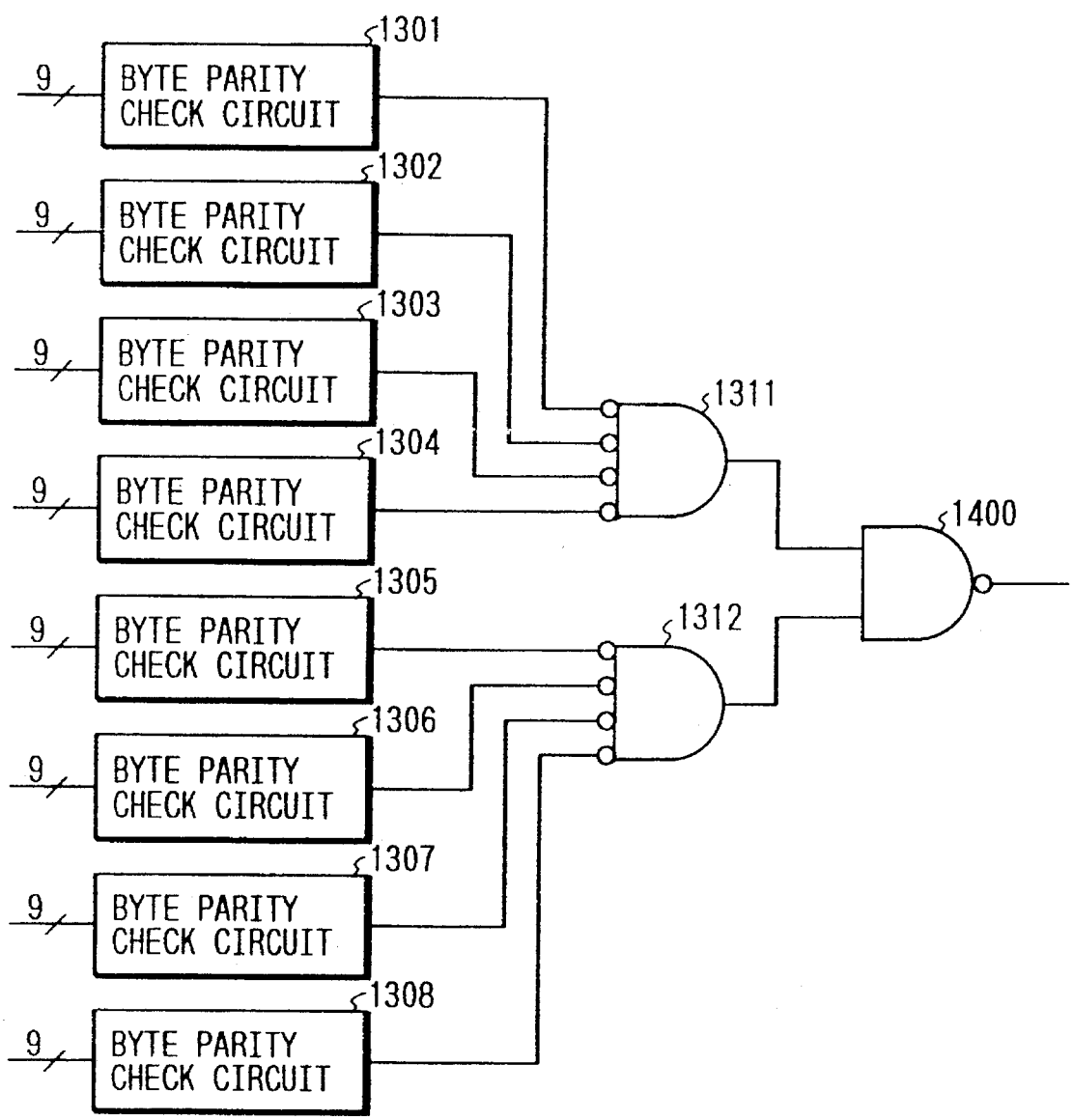
FIG. 13 shows a prior art 8 byte parity detection circuit diagram.

FIG. 13 shows a prior art parity check circuit for eight byte data. In the figure, numerals 1301 through 1308 denote byte parity detection circuits each comprising four stage EOR gates as shown in FIG. 14. Also, numerals 1311 and 1312 denote a four input NOR gate, and 1400 denotes a two input NAND gate. As can be appreciated from the above drawings, the prior art logic circuit requires six stage logic circuits from input to output, thereby requiring as many as 67 gate circuits.

On the other hand, the parity detection circuit according to the present invention is capable of being composed substantially of two stage logic circuits as shown in FIG. 2, thereby using only 32 gate circuits.

FIG. 3 shows a three input odd/even check circuit according to the present invention to be used as the parity check circuit in FIG. 2.

A, B and C in the figure, denote respective input signals, and Y denotes an output signal. Further, numerals 301 through 304 denote inverters, and 311 through 316 denote a path switch comprising a PMOS and an NMOS connected in parallel.

This embodiment circuit comprises 20 transistors, of which the slowest path is determined by a switching time of two inverters plus a through-time of two path switches. Since the inverter is the fastest of the CMOS gates, and the through-time of the path switch is a fraction of the delay time of the inverter, a high speed odd/even check is capable of being implemented.

Further, when the three input odd/even check circuit according to the present invention is applied to the byte parity detection circuit, such functions that required six logic stages in the prior art as described in FIGS. 13 and 14, will be implemented with only two logic stages. Therefore, it will be extremely effective in providing extra high speed and high density integration circuits.

FIG. 5 shows a multibit comparator of an embodiment of the present invention. In the figure, numerals 501-1 through 501-n, and 502-1 through 502-m denote a one bit comparator, respectively, which output a result of comparison for every one bit. In the one bit comparator 501-1, numeral 511 denotes a two input EOR circuit as shown in FIG. 6, and numeral 512 denotes an NPN, of which the collector is connected to a power source V3, the base is connected to the output of the EOR circuit 511, and the emitter is connected to a common output line 520. In this embodiment, when inputs $a_1$ and $b_2$ to the EOR circuit do not coincide with each other, an output thereof goes to "1" level to activate the NPN transistor 512, thereby outputting "1" level to the common output line 520. When they coincide with each other, the NPN is not energized. Respective outputs from 501-1 through 501-n are connected to the common output line 520 to be directed outside. Therefore, when all of 501-1 through 501-n are found to coincide, the common output line 520 goes to "0" level by an action of the pull-down circuit 525. Otherwise it goes to "1" level.

Likewise, when all of 502-1 through 502-n are found to coincide, another common output line 530 goes to "0" level by an action of the pull-down circuit 535, otherwise it goes to "1" level.

Therefore, a NOR gate 540 outputs "1" level only when all of (n+m) bits coincide, otherwise it outputs "0" level.

An exemplary method described in this embodiment, compares (n+m) bits by dividing into groups of n bits and m bits and integrates their results at the NOR gate 540. This, however, is intended to be illustrative and will not restrict the scope of applications of the present invention, as it is simply a matter of choice as to whether to divide into groups or not, and if so, into how many groups.

Figure 7:
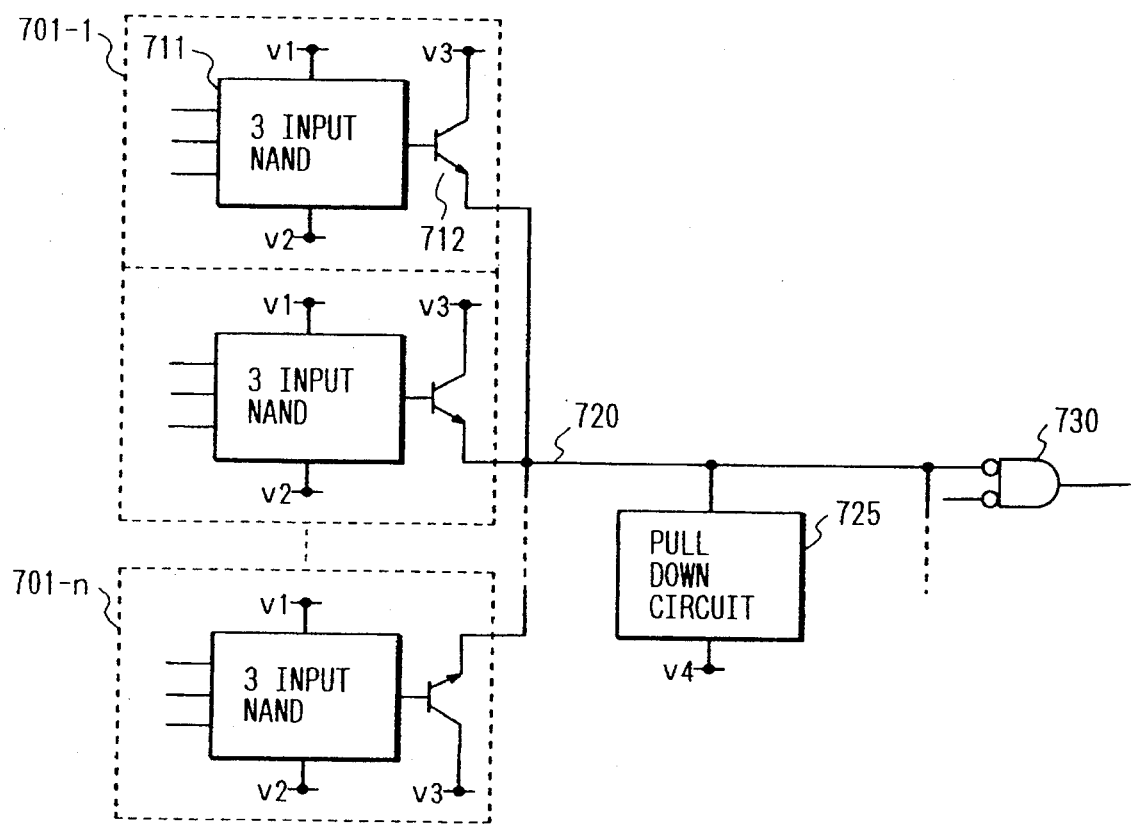
FIG. 7 shows a 3n input NAND circuit of an embodiment of the invention.
Figure 8:
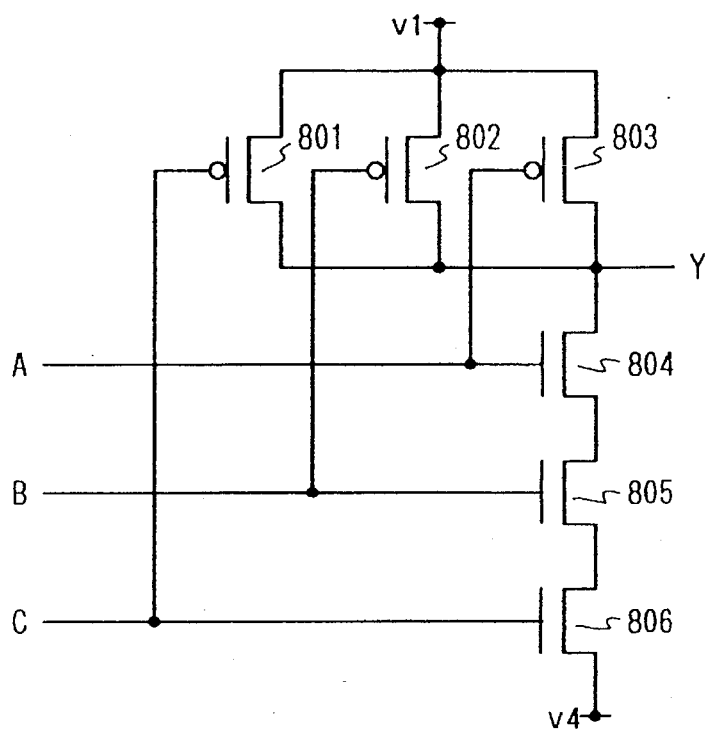
FIG. 8 shows a CMOS 3 input NAND circuit of an embodiment of the invention.

FIG. 7 shows an extra multibit NAND circuit of another embodiment of the present invention. In the figure, numerals 701-1 through 701-n denote a unit logic circuit comprising a three input NAND circuit. The unit logic circuit 711 is CMOS three input NAND circuits as shown in FIG. 8. Numeral 712 is an NPN, of which the collector is connected to a power source V3, the base connected to the output of the three input NAND 711, and the emitter connected to a common output line 720. Respective outputs from the unit logic circuits 701-1 through 701-n are connected for integration via leads to the common output line 720. Further, each of the unit logic circuits outputs "0" only when all of the three inputs are "1", thereby the NPN is not activated. When any one of the inputs is "0", it outputs "1", activating the NPN to put out "1" level to the common output line 720.

Therefore, the common output line 720 is capable of obtaining a NAND gate output corresponding to (3×n) inputs.

Further, numerals 725 denotes a pull-down circuit, and 730 is a logic circuit which utilizes the NAND output corresponding to (3×n) inputs.

In this embodiment, the unit logic circuit is comprised of three input NAND gates, which is intended, however, to be illustrative and will not restrict the scope of applications of the present invention, because it is simply a matter of choice as to how many inputs to choose. Increasing the number of inputs is advantageous in that the number of NPNs can be reduced. However, it should be noted that a CMOS gate having inputs exceeding four in number is likely to deteriorate its high speed performance and lower its noise margin greatly.

Figure 9:
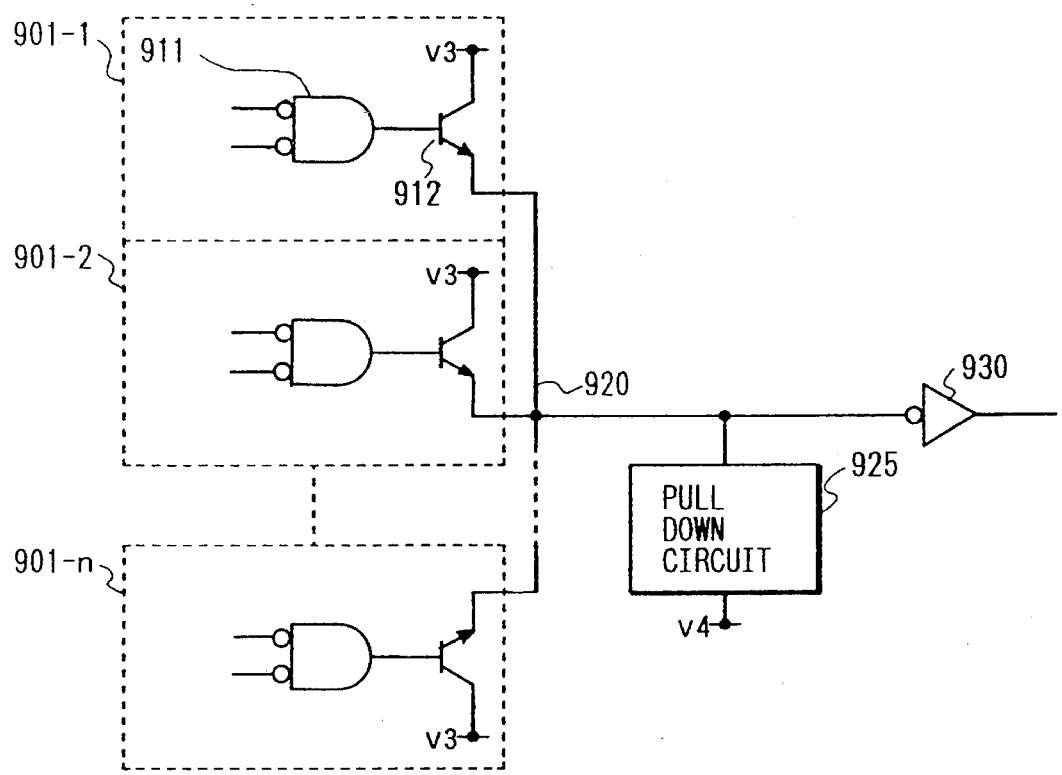
FIG. 9 shows an n for 1 multiplexer circuit of an embodiment of the invention.

FIG. 9 shows an n for 1 multiplexer circuit of another embodiment of the present invention. In the figure, numerals 901-1 through 901-n denote a unit logic circuit comprising a two input NOR. In the unit logic circuit 901-1, numeral 911 denotes a CMOS two input NOR gate, numeral 912 denotes an NPN, of which the collector is connected to a power source V3, the base is connected to the output of the two input NOR gate 911, and the emitter is connected to a common output line 920. A data signal is input to one of the two input terminals of the two input NOR gate 911, and a select signal is input to the other input terminal. Only when both signals are at "0" level, its output goes to "1", hence activating the NPN. It is the same with other unit logic circuits 901-2 through 901-n, and respective outputs therefrom are wired out and connected to a common output line 920 for integration, thus functioning as the n for 1 multiplexer.

Numerals 925 denotes a pull-down circuit, and 930 denotes a logic circuit which utilizes the output of the multiplexer.

FIG. 10 is an auxiliary figure explaining the minimum requirements for a device structure necessary for achieving a desired effect in the implementation of the present invention.

In the figure, numerals 101 denotes a PMOS, 102 denotes an NMOS, 103 denotes an NPN, and 104 denotes a parasitic collector resistance.

The most important feature herewith is that the collector parasitic resistance 104 is capable of being realized in an appropriate value of sufficiently small resistance. Assuming that the PMOS 101 is turned on at V1=V3, then, the base potential of NPN 103 increases approximately to V1. On the other hand, NPN 103 is also turned on, flowing a collector current Ic. As the result, the collector potential Vc becomes as follows.

$$Vc=V3-Ic \cdot rc < V1$$

then, NPN 103 enters into a saturated operation. Therefore there arises a fatal problem that the switching speed becomes extremely slow. It is a common practice to permit a peak current of several mA to flow in an emitter follower circuit, thereby such having a collector parasitic resistance exceeding an order of 100Ω are precluded in practice.

The next most important advantage is that the substrate of PMOS 101 is formed in isolation from the collector region of NPN 103. If the sustrate is at the same potential as the collector of NPN 103 without being isolated from the collector region of NPN 103, the substrate potential of PMOS 101 are subject to modulation due to the voltage drop of Ic.rc, then, PMOS 101 will have a strong negative feedback, thus failing to supply a sufficient base current to NPN 103.

It can be appreciated from the above description that those utilizing an NPN transistor, of which the collector is formed in a CMOS process substrate, or a PMOS transistor, of which the substrate is formed in a bipolar process collector region cannot accomplish the advantages and effects of the present invention.

FIG. 11 shows a cross-section view of a device structure of another embodiment of the present invention. In the figure, 1100 denotes a P-type substrate, 1101 denotes an $N^+$ type imbedded layer, 1102 and 1103 denote an N-type well formed in the surface of the P-type substrate. The P-type substrate 1100 is connected to a current V2 through a $P^+$ diffusion layer 1120.

PMOS 101 is formed with $P^+$ diffusion layers 1105 and 1106 formed in the N-type well 1102 as its source and drain, respectively, and 1107 as its gate electrode. Also, the N-type well 1102 which serves as the substrate of PMOS 101 is connected to a power source V1 through $N^+$ diffusion layer 1108.

NMOS 1102 is formed on the P-type substrate 1100 with $N^+$ diffusion layers 1108 as its drain, 1109 as its source, and 1110 thereabove as its gate electrode.

NPN 103 is formed with an N-type well 1103 as its collector, a P-type diffusion layer 1104 as its base and an $N^+$ diffusion layer 1113 as its emitter, and its base electrode is drawn out through a $P^+$ diffusion layer 1112 and is connected to respective drains of PMOS 101 and NMOS 102 via interconnection lead. The collector of NPN 103 is drawn out through $N^+$ imbedded layer 1101 via interconnection lead to be connected to a power source V3.

The important feature in this structure is that the collector of NPN 103 is formed in isolation from the chip substrate 1100, and that it provides such a structure whereby the parasitic collector resistance 104 can be made sufficiently small because its collector electrode is drawn out through the $N^+$ semiconductor layer 1101.

The next important feature with this structure is that because the N-type well 1102 serving as the substrate of PMOS 101 is formed in a semiconductor region independent of the collector 1103 of NPN 103, the substrate potential in PMOS 101 is immune to modulation due to switching operation of the NPN transistor.

Figure 12:
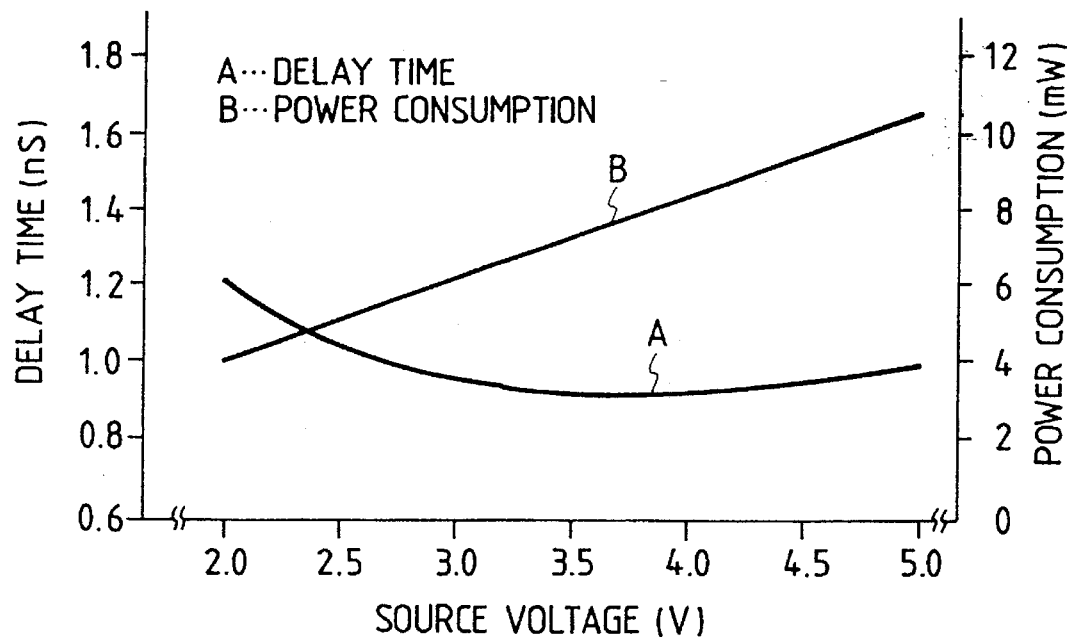
FIG. 12 shows the result of simulation of the invention.

FIG. 12 shows the result of measurements by computer simulation on the characteristics of a 22 bit comparator according to the present invention. In the figure, A denotes delay time, and B denotes consumed power. It can be appreciated that, for example, at an energy consumption of 7 mW, an extra high speed operation of 0.9 ns is obtainable, and that at a power voltage of 2.5 V, energy consumption is 5 mW and a delay time is 1.0 ns. As a result, it can be appreciated that the embodiments of the present invention are capable of attaining their intended effectiveness while conforming to the standard power voltage, not only of 3.3 V which is the goal for the next generation applications, but also of 2.0 to 2.5 V which is the goal for those applications coming beyond the next generation.

The above computer simulation has been conducted on 0.5 μm BiCMOS process device models with the pull-down current set at 2 mA.

The present invention is not restricted in its applications only to microprocessors, but may also be applied to various types of logic LSIs and memory LSIs with the same advantages being effected.

Hereinabove, the present invention has been described in detail with reference to preferred embodiments, but is not restricted to the above embodiments, and it will be understood by those skilled in the art that various changes in form and detail may be therein without departing from the spirit and scope of the invention.

For example, the CMOS logic circuits described in the preferred embodiments and illustrated in the drawings are full complementary circuits having an equal number of PMOS and NMOS, but they may be obviously of other types. Further, the bipolar transistors described in the embodiments are of the NPN single emitter type, but may be obviously implemented by using multi-emitter types. It is also possible to be implemented on a PNP transistor by using a pull-up circuit instead of the output pull-down circuit.

Figure 17:
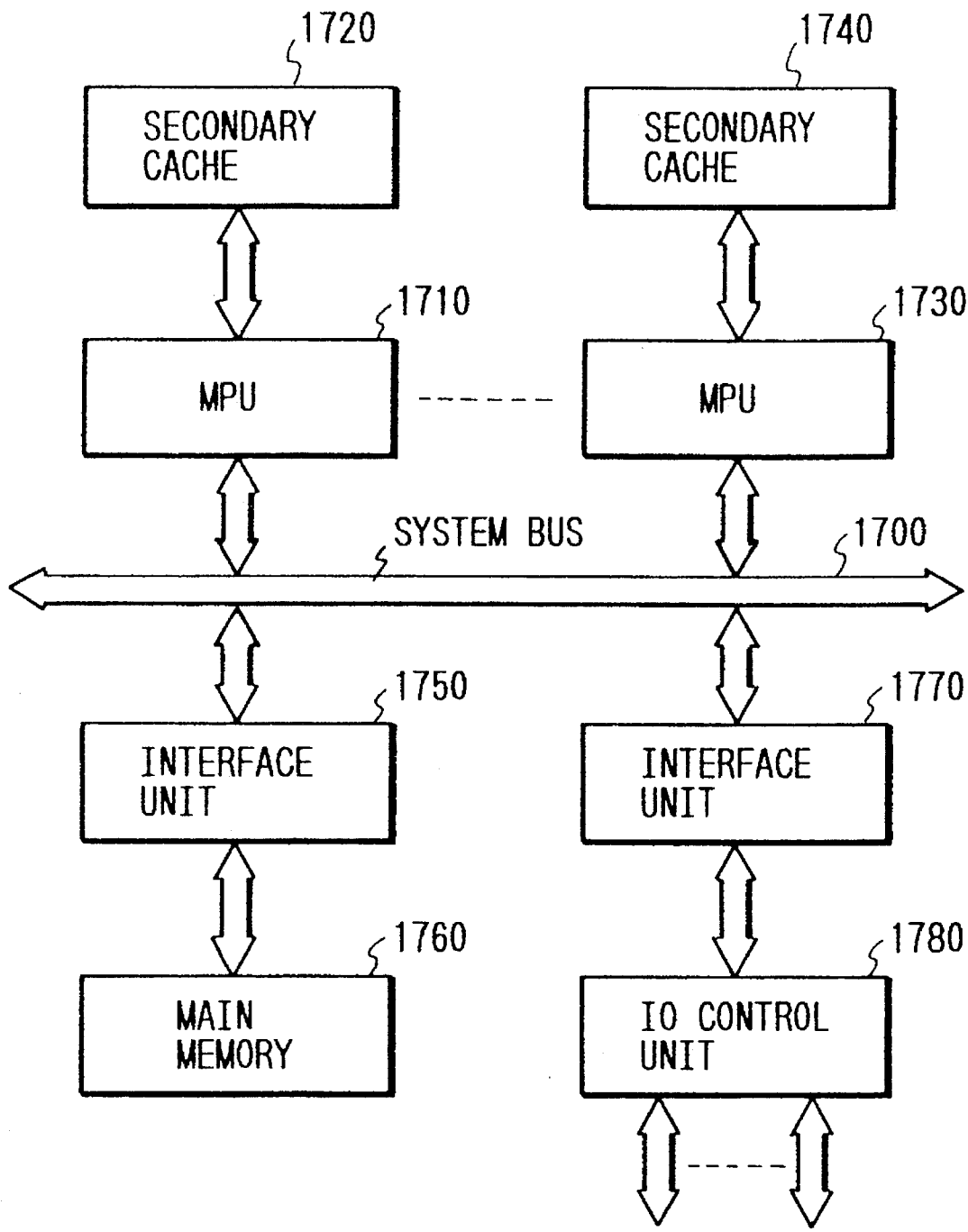
FIG. 17 shows a microprocessor of an embodiment of the invention.

FIG. 17 shows a multiplexer using a plurality of microprocessors of an embodiment of the present invention. In the figure, numerals 1710 and 1730 indicate microprocessors which are the same as shown in FIG. 1, corresponding to each of them, there are provided secondary caches 1720 and 1740, respectively. Because a shorter access time is required with respect to the machine cycle for the microprocessors 1710 and 1730, high speed SRAMs are normally utilized as the secondary caches 1720 and 1740. A plurality of microprocessors 1710, 1730 are linked via a system bus 1700. Further, a main memory 1760 is connected to the system bus 1700 via an interface unit 1750. As the main memory 1760 requires a large capacity of memory, DRAMs of very large integration are usually utilized. Still further, an IO controller 1780 is connected to the system bus 1700 via an interface unit 1700 for controlling data exchange between the main memory 1760 and other various IO units such as magnetic disks and so on.

Now, in order to implement a high speed operation synchronous with a clock frequency exceeding 100 MHz, microprocessors 1710, 1730 have such BiCMOS super multi input logic circuits as exemplified in FIGS. 2, 5, 7 and 9, each installed in respective key circuits. In particular, the microprocessors 1710, 1730 according to the embodiment of the present invention are characterized by comprising a bus snoop circuit indicated by numeral 101-1 in FIG. 1, which is composed of a BiCMOS super multiple input logic circuit as shown in FIG. 5. This logic circuit features a super high speed operation with a delay time as small as 0.9 ns at a source voltage of 3.5 V as shown in FIG. 12. Therefore, even in the future when the trend for a higher speed operation advances with the system bus frequency exceeding 100 MHz, microprocessors 1710, 1730 are capable of monitoring the bus status in sufficiently short period of time, maintaining the coherency of data in the internal cache main memory 1760.

As obviously appreciated from the above description, according to the present invention, extra high speed microprocessor and various types of extra high speed LSIs are capable of being provided, because extra multiple input complex logic circuits indispensable to high speed operation of microprocessors are implemented by reduced number of logic stages as small as substantially one or two stages.

What is claimed is:

1. A microprocessor comprising:

an interface control unit for receiving an input;

first and second busses connected to said interface control unit;

a cache memory unit connected to said interface control unit via said first and second busses;

a memory management unit, connected to said interface control unit via said first bus, for controlling read-out and write-in from and to said cache memory;

an instruction control unit for outputting instructions to said memory management unit;

an arithmetic operational unit connected to said interface control unit via said second bus; and a register file unit connected to said interface control unit via said second bus;

wherein, at least one of said units is provided with a plurality of unit logic circuits, each of said unit logic circuits comprising:
   a logic unit including at least one CMOS circuit for outputting one signal in response to a plurality of input signals, and
   an output unit including a bipolar transistor having the collector connected to a power source, the base connected to an output of said logic unit, and the emitter connected to a common output line;

a connection node coupled to said common output line for connecting together outputs from said unit logic circuits; and a common output line pull-down circuit provided between said connection node and a reference voltage for pulling down said common output line to a same level as said reference voltage when said common output line is not energized, wherein a logic output is output from said connection node in response to a plurality of input signals.

2. The microprocessor claimed in claim 1, wherein said microprocessor operates at a power source voltage of 2 V to 5 V.

3. The microprocessor claimed in either of claims 1 or 2, wherein a substrate of a PMOS transistor in said at least one CMOS transistor included in said logic unit is formed in a different region of a semiconductor than a collector region of an NPN transistor which constitutes an output unit of said unit logic circuit.

4. The microprocessor claimed in claim 3, wherein said NPN transistor of said unit logic circuit includes a collector region formed in a region of said semiconductor independent of the substrate of said semiconductor.

5. A complex logic circuit comprising:

N (N≧2) number of unit logic circuits, each of said unit logic circuits including:
   a CMOS logic circuit for outputting one signal in response to M (M≧1) input signals, and
   a bipolar transistor, of which the collector is connected to a power source, the base is connected to an output of said CMOS circuit, and the emitter being connected to a common output line;

a connection node coupled to said common output line for connecting outputs of said unit logic circuits; and common output line pull-down means provided between said connection node and a reference voltage for pulling down the common output line to a same level as said reference voltage when said common output line is not energized, wherein one logic output is output in response to M×N input signals from said connection node.

6. The complex logic circuit claimed in claim 5 wherein said logic output is connected to one input of any of a CMOS logic circuitry, a BiCMOS logic circuitry and an ECL logic circuitry.

7. A parity check circuit comprising:

M(M≧2) byte parity check circuits; and common output line pull-down means, provided between a common output line of said byte parity check circuits and a reference voltage, for pulling down the common output line to a same level as the reference voltage when the common output line is not energized;

wherein, each of said byte parity check circuits comprises:

a CMOS logic circuit for conducting an odd-even check on a plurality of input signals per every unit byte, and a bipolar transistor, of which the collector is connected to a power source, the base is connected to an output of said CMOS logic circuit, and the emitter is connected to the common output line.

8. The parity check circuit claimed in claim 7, wherein each of said byte parity checks comprise a two-stage logic configuration having a CMOS-based three-input odd check circuit and an even check circuit.

9. A semiconductor memory device comprising the parity check circuit claimed in claim 7 or 9.

10. A register file device comprising the parity check circuit claimed in claim 7.

11. A comparator circuit comprising:

M (M≧2) one bit comparator logic circuits, each of said one bit comparator logic circuits including:
a CMOS logic circuit for comparing two sets of data according to a unit bit, and a bipolar transistor, of which the collector is connected to a power source, the base is connected to an output of said CMOS logic circuit, the emitter is connected to a common output line, and respective output terminals of said bipolar transistor being connected together at a connection node coupled to said common output line; and common output line pull-down means provided between said connection node and a reference voltage for enabling comparison of M bit data and outputting a result of the comparison from said connection node and for pulling down the common output line to a same level as said reference voltage when said common output line is not energized.

12. A semiconductor memory device including at least one comparator logic circuit as claimed in claim 11, wherein the two sets of data include a read-out output from a memory and predetermined comparison data.

13. A microprocessor comprising:

an on-chip cache; and a bus supervisory unit, or snooper unit, including at least one comparator circuit as claimed in claim 11, wherein the two sets of data include bus address information and a cached address.

14. A NAND circuit for (M×N) bit inputs comprising:

N (N≧2) CMOSNAND gates having M (M≧1) inputs;

a bipolar transistor, of which the collector is connected to a power source, the base is connected to an output of a corresponding one of said CMOSNAND gates, and the emitter is connected to a common output line;

a connection node at the common output line for connecting together outputs of respective bipolar transistors; and common output line pull-down means provided between said connection node and a reference voltage, with said connection node serving as an output terminal and for pulling down the common output line to a same level as said reference voltage when said common output line is not energized.

15. An N for one selector circuit comprising:

N (N≧2) CMOSNAND gates having M (M≧1) inputs;

a bipolar transistor, of which the collector is connected to a power source, the base is connected to the output of a corresponding CMOS gate, and the emitter is connected to an output of a common output line;

a connection node coupled to said common output line for connecting together outputs of respective bipolar transistors; and common output line pull-down means provided between said connection node and a reference voltage, with said connection node serving as an output terminal, for pulling down common output line and the outputs connected at the connection node to a same level as said reference voltage when the connected outputs are not energized.

16. A complex logic circuit comprising:

a CMOS logic circuit including:
a PMOS transistor, of which the source being connected to a first power source, the gate is connected to an input, and the drain is connected to the base of an NPN transistor, an NMOS transistor, of which the drain is connected to the base of the NPN transistor, the gate is connected to an input of said CMOS logic circuit, and the source is connected to a second power source, an NPN transistor, of which the collector is connected to a third power source, the base is connected to the output of said CMOS logic circuit, and the emitter connected to a common output, and common output pulling-down circuit disposed between said common output and said second power source for pulling down the common output to a same level as said second power source when said common output is not energized.

17. The complex logic circuit claimed in claim 16, wherein a substrate of said PMOS transistor included in said CMOS logic circuit is formed in a different semiconductor region than said collector of said NPN transistor.

18. The complex logic circuit claimed in either of claims 16 or 17, wherein said first power source voltage and said third power source voltage have a same potential.

19. The complex logic circuit claimed in either of claims 16 or 17, wherein said first power source voltage is lower than said third power source voltage.

20. The complex logic circuit claimed in either of claims 16 and 17, wherein said common output pull-down means is provided between the common output and a reference voltage.

21. An effective BiCMOS extra multi-input complex logic circuit connected to at least one other logic circuit, said BiCOS logic circuit comprising:

a basic unit logic circuit for outputting a first output signal from a first output node, including:
a first logic circuit having a CMOS transistor for performing logical operations with M(M≧1) input signals, outputting a second output signal from a second output node, and an output unit having a bipolar-transistor, of which the collector is connected to a first power source, the base is connected to said second output node and the emitter is connected to said first output node, for amplifying said second output signal and outputting said first output signal from said first output node;

a common output line for collectively receiving a plurality of first output signals; and common output pull-down means connected between said common output line and a second power source for pulling down said common output line to a level of said second power source when said common output line is not energized.

* * * * *